United States Patent [19]

Araoka

[11] 4,114,955
[45] Sep. 19, 1978

[54] METHOD AND APPARATUS FOR TRANSFERRING MATERIAL WITH THE USE OF A FLUID

[75] Inventor: Toshinobu Araoka, Kitakyushu, Japan

[73] Assignee: Toyo Denki Kogyosho Co., Ltd., Fukuoka, Japan

[21] Appl. No.: 804,472

[22] Filed: Jun. 7, 1977

[30] Foreign Application Priority Data

Sep. 17, 1976 [JP] Japan .................. 51-112284

[51] Int. Cl.² .......................................... B65G 53/30
[52] U.S. Cl. .......................................... 302/15; 302/57
[58] Field of Search .................. 302/8, 14, 15, 21, 37, 302/51, 57, 27, 36, 56

[56] References Cited

U.S. PATENT DOCUMENTS

| Re. 11,582 | 1/1897 | Evans | 302/14 |
|---|---|---|---|
| 1,074,606 | 10/1913 | Christoph | 302/37 X |
| 1,686,793 | 10/1928 | Brcecinski | 302/37 |
| 1,779,264 | 10/1930 | Seehusen | 302/49 X |
| 2,389,533 | 11/1945 | Nickla et al. | 302/37 |
| 2,408,675 | 10/1946 | Norton | 302/37 |
| 3,653,720 | 4/1972 | Craig | 302/15 |
| 3,982,789 | 9/1976 | Funk | 302/15 X |

FOREIGN PATENT DOCUMENTS 1,174,696  7/1964  Fed. Rep. of Germany ............ 302/51

Primary Examiner—Evon C. Blunk
Assistant Examiner—James L. Rowland
Attorney, Agent, or Firm—Frank J. Jordan

[57] ABSTRACT

Transferring a material from a first location to a second location while suspended in a fluid includes providing a stream of a pressurized fluid and an arcuate circulation path for admixture of the material and fluid, introducing at least a portion of the pressurized fluid from the stream into the circulation path and also introducing the material into the circulation path. The mixture of pressurized fluid and material is returned to the stream of pressurized fluid and conveyed to the second location.

14 Claims, 9 Drawing Figures

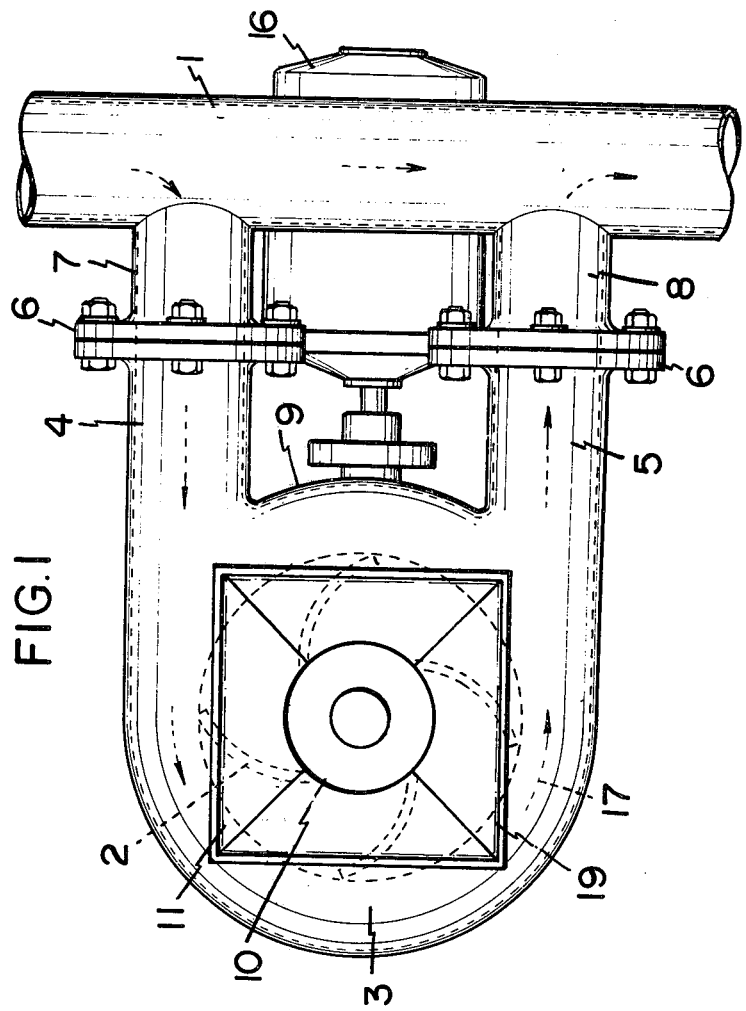

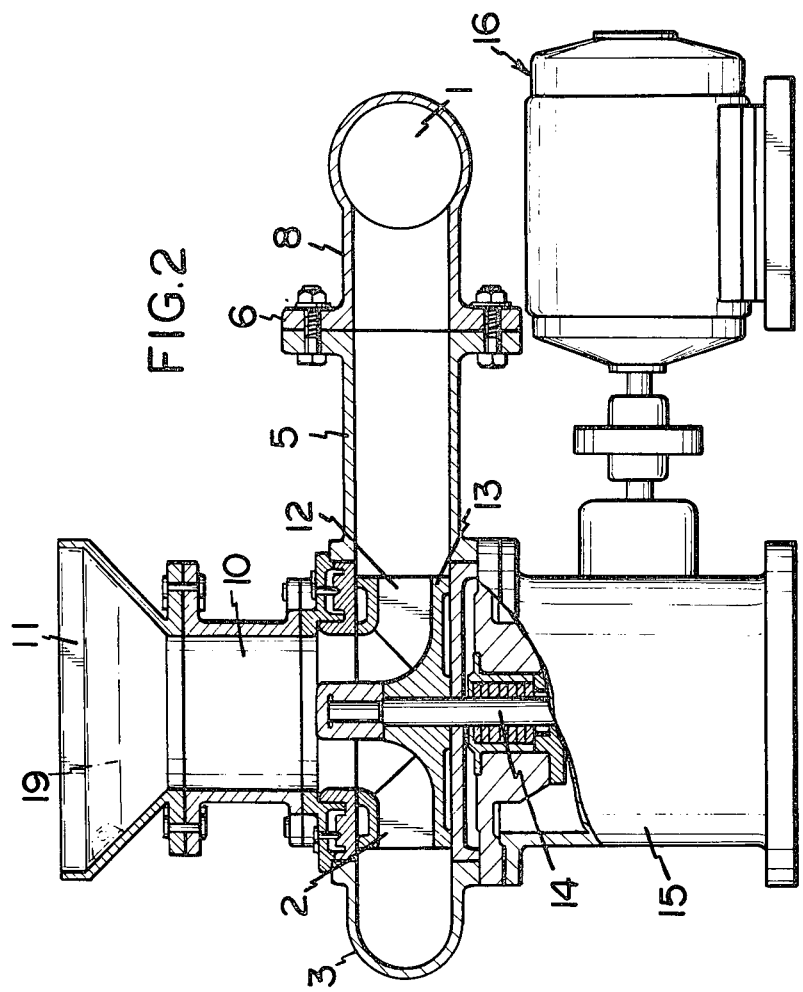

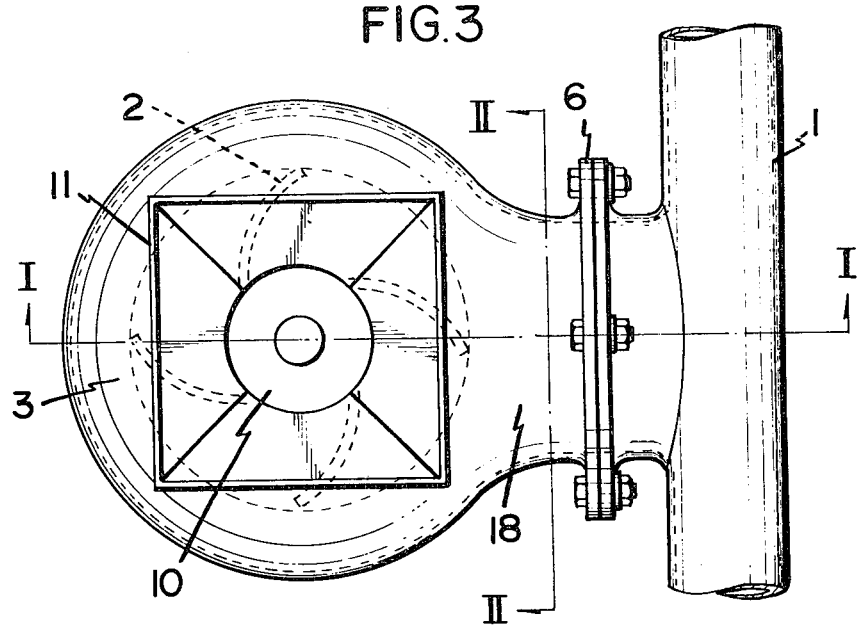
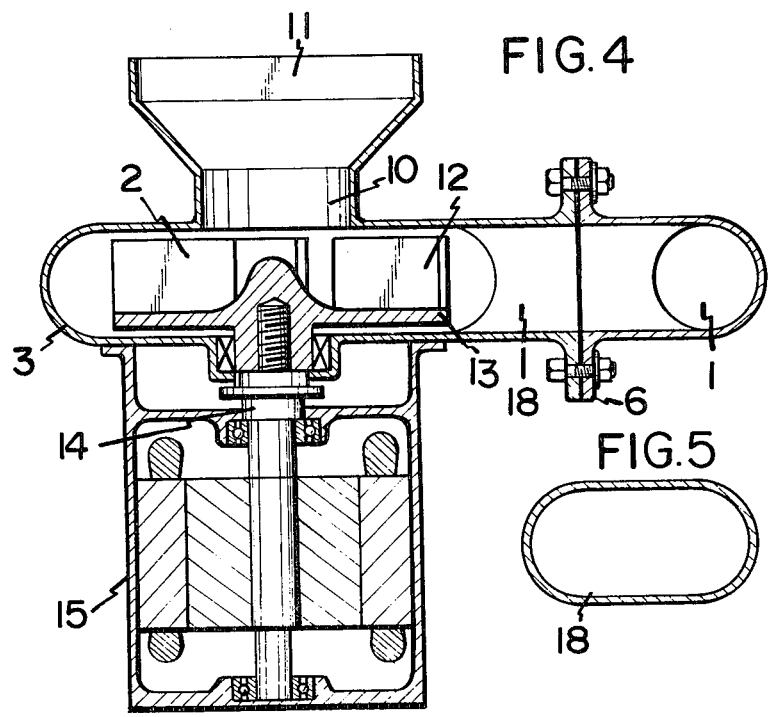
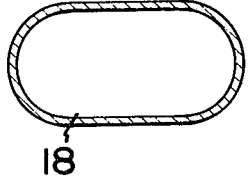

ମETHOD AND APPARATUS FOR TRANSFERRING MATERIAL WITH THE USE OF A FLUID

BACKGROUND OF THE INVENTION

This invention relates to a method and apparatus for transporting material in admixture with a fluid such as water or air from one location to another. The invention is especially applicable in civil engineering applications such as in tunnel construction.

In present day tunnel construction, the shield driving or cofferdam method has been often used when the tunnel must be constructed in soft ground.

Conventionally, the excavated mud or sand and water are separately transferred to the inlet of the tunnel by means of a long belt conveyor and a water discharge pipe.

Since conveyance and such discharging devices must be positioned within the tunnels the work space within the tunnel becomes more limited and cannot be efficiently employed. The tunnel construction is thus hampered by the presence of such apparatuses.

Applicant's invention is premised upon the proposition that if the water produced by the tunneling can be transported out of the tunnel together with material such as mud or sand that has been excavated by, for example, a shielding machine, then the separate means for transferring the solid material, such as a tunnelling belt conveyor, can be eliminated thereby resulting in an improvement of the tunnelling construction as well as a simplification of the tunneling facilities.

It is an object of the present invention to provide an improved method for removing excavated materials and water from a tunnelling site and to transfer such materials to any desired location.

It is another object of the present invention to provide an apparatus for carrying out the foregoing method.

BRIEF DESCRIPTION OF THE DRAWINGS

FIG. 1 is a plan view of the apparatus of this invention which can transfer any desired material such as mud or sand together with a fluid such as water or air, FIG. 2 is a side view, partially broken away, of the apparatus of FIG. 1, FIG. 3 is a plan view of a first modification of the apparatus of FIG. 1, FIG. 4 is a cross-sectional side view of the apparatus of FIG. 3 taken along the line I—I of FIG. 3, FIG. 5 is a cross-sectional view of the apparatus of FIG. 3 taken along the line II—II of FIG. 3.

DETAILED DESCRIPTION OF THE INVENTION

Figure 6:
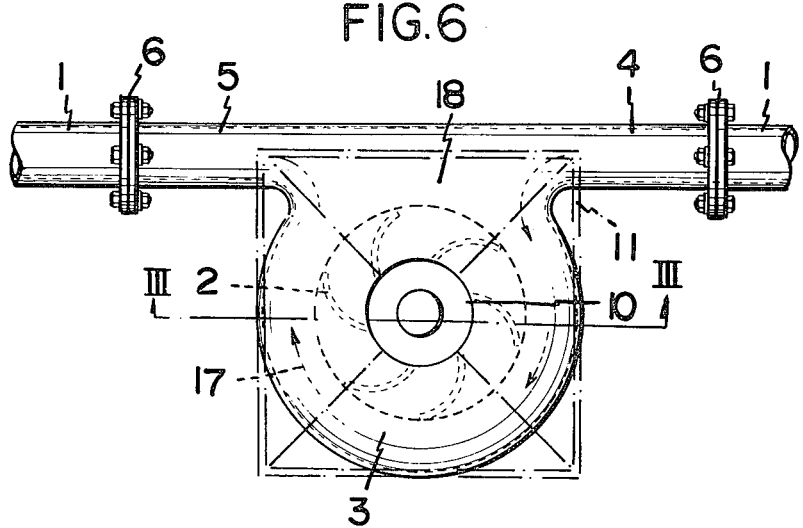
FIG. 6 is a plan view of a second modification of the apparatus of this invention.

The method and apparatus of this invention are described in detail hereinafter with reference to the accompanying drawings.

Referring to the preferred apparatus shown is FIG. 1 and FIG. 2, the apparatus is characterized in that a water circulating chamber 9 is U-shaped in plan view and both ends thereof communicate with axially spaced portions of a water discharge pipe 1.

In the drawings, the arrows on the pipe 1 show the flow direction of water within the pipe 1.

The apparatus includes, a casing 3 which circularly encloses an impeller 2 therein. Two spaced-apart communicating tubes 4, 5 are, in turn, connected with the water discharge pipe 1 by suitable means such as flange joints 6. Numerals 7 and 8 indicate spaced-apart communicating tubes secured at one end to the water discharge pipe 1 and at the other end to flanges 6 which are connected to communicating tubes 4, 5 of the U-shaped casing 3.

The casing 3 substantially comprises a water circulating chamber 9 and is shown as having a vertical material inlet 10 through which the material to be transferred such as mud or sand is charged at the center of the water circulating chamber 9. For facilitating the charging of the above material, the inlet 10 is provided with a truncated cone-shaped hopper 11.

The impeller 2 employed in this invention is of a conventional type which is provided with a plurality of circumferentially equidistant blades 12 extending radially and a circular plate 13 to which the blades are integrally secured and carried by drive shaft 14. Impeller is disposed coaxially with the inlet 10.

If desired, inlet 10 can be secured to any part of the casing 3 other than the vertical position shown in FIG. 1 and FIG. 2 providing the material can be charged into the water circulating chamber 9. Of course the hopper 11 must be formed such that the material to be transferred can be introduced into the inlet 10 provided in a specific position of the casing 3.

At the bottom of the casing 3, a drive mechanism is provided which comprises a rotary drive shaft 14 for rotating the impeller 2, a speed reducing means 15 and a power-operated motor 16.

In the drawings, numeral 19 indicates a lid means which can be removably mounted on the hopper 11 and is constructed such that it opens in response to activation of the impeller 2.

The manner in which the device of this embodiment is operated is as follows.

When the water, which is subject to pressure by a suitable pumping means not shown in the drawing, starts flowing under pressure through the water discharge pipe 1 in the directin of the arrows shown in FIG. 1, a portion of the fluid flows into the casing 3 by way of the communicating tubes 4, 5 and would normally tend to overflow from the inlet 10. However, since the rotation of the impeller imparts a centrifugal force to the fluid within the casing 3, the water pressure within the casing 3 is maintained at a level equal to or more than that of the water pressure which passes through the water discharge pipe 1.

The water under pressure is thus urged radially outwardly against the outer periphery of the water circulating chamber 9 of casing 3 thereby preventing any overflow of the water from inlet 10, the circulating water portion 17 being formed within the casing 3.

In other words, the impeller 2 works as a valve for the inlet 10 which is exposed and open to the atmosphere. Therefore, when the material to be transferred such as mud or sand is charged into the hopper 11 under the conditions described above such material is also subject to the centrifugal force caused by the rotation of the impeller 2 and is mixed into the circulating water portion 17. The thus mixed body of water and mud or sand is forced into the water discharge pipe 1 by way of the communicating tube 5, and it passes through pipe 1 until it is discharged at a suitable location generally remote from the material charging site.

One modification of the casing construction is shown in FIG. 3 and FIG. 4 wherein the casing 3 communicates with the water discharge pipe 1 by means of only one communicating tube 18.

Figure 7:
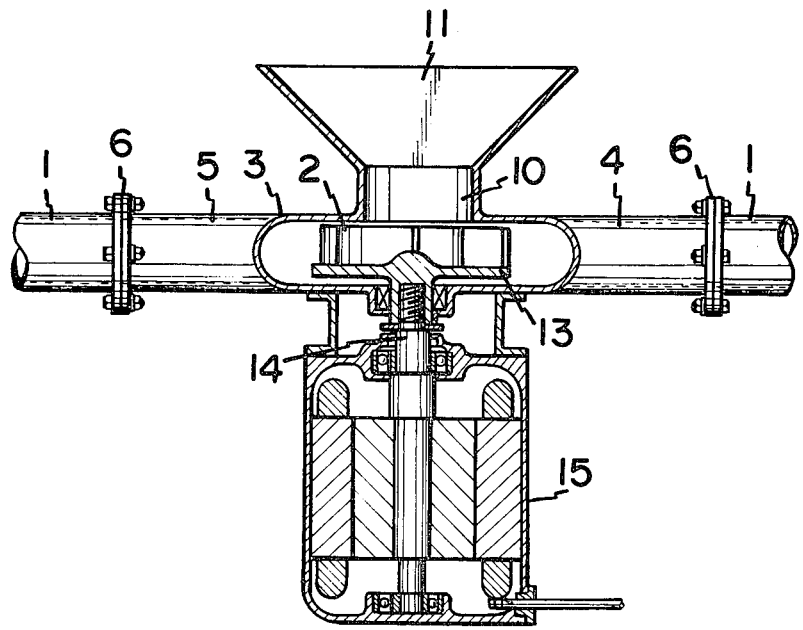
FIG. 7 is a cross-sectional side view of the apparatus of FIG. 6 taken along the line III—III of FIG. 6.

Another modification of casing 3 is shown in FIG. 6 and FIG. 7 wherein the casing 3 and the water discharge pipe 1 form substantially a Ω shape.

Figure 8:
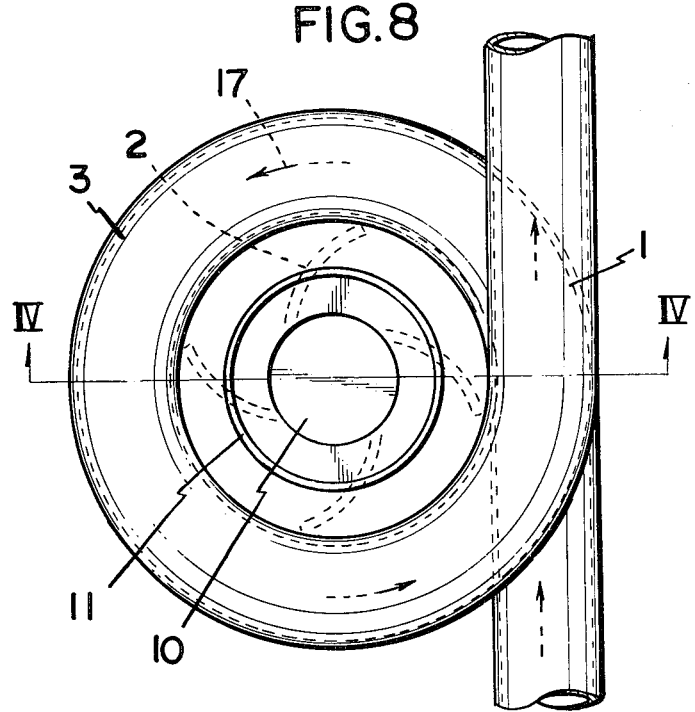
FIG. 8 is a plan view of a third modification of the apparatus of this invention.
Figure 9:
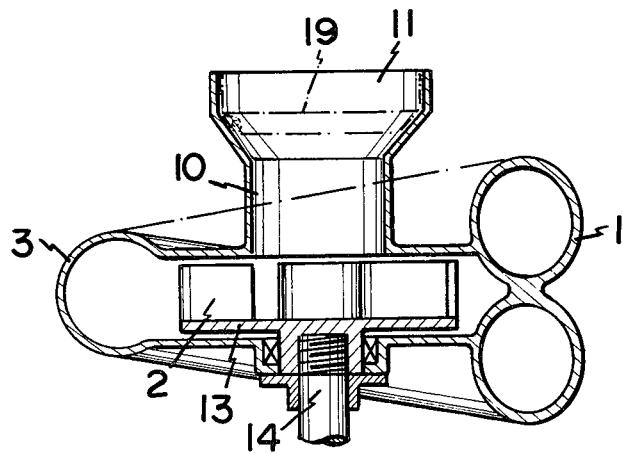
FIG. 9 is a cross-sectional side view of the apparatus of FIG. 8 taken along the line IV—IV of FIG. 8.

Still another modification of casing 3 is shown in FIG. 8 and FIG. 9 wherein the casing 3 forms a loop. In this loop-shaped casing 3, since the circular portion of the fluid also forms a loop, the mixing of the material to be transferred with the fluid as well as the transfer of this mixed body within the casing are smoothly conducted.

Based upon the above concept, it must be also noted that conventional volute pumps or underwater pumps can be connected with the middle portion of the water discharge pipe 1 so as to achieve substantially the same effect.

In the practice of this invention, any material such as mud, sand, gravel or clay which can be mixed with a fluid such as water, air or gas, can be considered as material that is transferrable.

As has been described heretofore, the method and apparatus of this invention has the following advantages.

(1) Due to the specific construction set forth heretofore, the material to be transferred can be transferred together with the fluid to be discharged so that it has now become unnecessary to employ means which were used only for the transferring of material.

(2) Since the apparatus has substantially a very simple construction, the handling as well as the maintenance of the apparatus is facilitated.

(3) Due to the specific construction set forth heretofore, the material to be transferred can be conveyed to any suitable location.

(4) An existing fluid discharge pipe can also be used in the practice of this invention since the circular casing can be attached to such pipe with only slight modification of the related portion thereof.

While there has been described what is at present considered to be the preferred embodiment of this invention, it will be understood that various modifications may be made therein, and it is intended to cover in the appended claims all such modifications that fall within the spirit and scope of the invention.

What I claim is:

1. A method of continuously introducing a material containing solid matter into a continuously flowing pressurized stream of liquid disposed in a discharge pipe utilizing a motor driven impeller operable in a casing, comprising the steps of conducting said liquid along an inlet liquid path extending from a first location of said flowing pressurized stream to said casing, conducting said liquid along an outlet liquid path extending from said casing to a second location of said flowing pressurized stream, said second location being disposed downstream of said first location along a through section of said flowing pressurized stream, centrifugally increasing the pressure of said liquid in said casing by rotating said impeller about a vertical axis, causing the liquid to flow generally horizontally from said inlet liquid path to said outlet liquid path while effecting said pressure increase in said casing, charging said material to be transferred generally vertically through an opening in an upper side of said casing, mixing said vertically charged material with said liquid in said casing, conducting said liquid and material from said casing along said outlet liquid path at a pressure greater than the pressure of said flowing pressurized stream in said discharge pipe to discharge said liquid and material into said flowing pressurized stream at said second location, and continuously maintaining the pressure in said outlet path higher than the pressure of said flowing pressurized stream and higher than the pressure in said inlet liquid path such that the liquid passes through said casing from said inlet liquid path to said outlet liquid path without any fluid loss through said opening in said casing during said charging of said material into said casing.

2. A method according to claim 1, wherein said opening in said casing is open to the atmosphere.

3. A method according to claim 1 comprising charging said material directly into the liquid which is being subjected to centrifugal force by said impeller, and thereby imparting a centrifugal force to said material as the latter mixes with the liquid.

4. A method according to claim 1 comprising charging said material through a hopper, and maintaining said hopper open to the atmosphere during said charging step.

5. A method according to claim 1, wherein said material comprises sand and mud excavated in situ during the course of a tunnel construction and said liquid is water produced by the excavation.

6. A method according to claim 1 comprising utilizing said rotating impeller as a valve to preclude flow of liquid out of said opening in said casing.

7. Apparatus for transferring a material containing solid matter from a first location to a second location while suspended in a liquid comprising a discharge pipe carrying a pressurized liquid; a casing having a top portion, a bottom portion, and a portion which is at least partially arcuately shaped; means defining an inlet liquid path leading from a first location of said discharge pipe to said casing, means defining an outlet liquid path leading from said casing to a second location of said discharge pipe, said second location being disposed downstream of said first location along a through section of said discharge pipe; an impeller concentrically and rotatably mounted in said casing and operable to impart a centrifugal force to the liquid within the casing, said impeller being mounted on a vertically disposed rotatable shaft which extends from said bottom portion of said casing; inlet means having an opening on said upper portion of said casing for charging said material generally vertically downwardly into said casing; and power means for driving said impeller so as to impart and continuously maintain a pressure of the liquid in the said outlet liquid fluid path which pressure is higher than the pressure in said discharge pipe and higher than the pressure in said inlet liquid path such that the liquid and the material to be transferred flows from said casing along said second liquid path for discharge into said discharge pipe at said second location, while the driven impeller acts as a valve to continuously preclude flow of liquid out through said opening in said casing through which the material to be transferred is charged.

8. Apparatus according claim 7, claim7, wherein said opening in said casing is open to atmosphere.

9. Apparatus according to claim 7, wherein said inlet means includes a hopper of substantially frusto-conical cross-section.

10. Apparatus according to claim 7, wherein said casing has a circulating chamber which is substantially U-shaped in plan view.

11. Apparatus according to claim 7, wherein said through section of said discharge pipe between said first location and said second location is generally horizontally disposed.

12. Apparatus according to claim 7, wherein said through section of said discharge pipe between said first location and said second location has a substantially constant inner diameter.

13. Apparatus according to claim 7, wherein said rotating impeller serves as a valve to preclude flow of liquid out of said opening in said casing.

14. Apparatus according to claim 7, wherein said power means is mounted on said bottom portion of said casing.

* * * * *